US011212223B2

(12) United States Patent
Gupta et al.

(10) Patent No.: US 11,212,223 B2
(45) Date of Patent: Dec. 28, 2021

(54) UPLINK SELECTION IN A SD-WAN

(71) Applicant: Hewlett Packard Enterprise Development LP, Houston, TX (US)

(72) Inventors: Gopal Gupta, Bangalore (IN); Abhinesh Mishra, Bangalore (IN); Ataur Rehman, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 34 days.

(21) Appl. No.: 16/735,028

(22) Filed: Jan. 6, 2020

(65) Prior Publication Data

US 2020/0344163 A1 Oct. 29, 2020

(30) Foreign Application Priority Data

Apr. 27, 2019 (IN) .............................. 201941016839

(51) Int. Cl.
*H04L 12/721* (2013.01)
*H04L 12/26* (2006.01)

(52) U.S. Cl.
CPC .............. *H04L 45/70* (2013.01); *H04L 43/50* (2013.01)

(58) Field of Classification Search
CPC combination set(s) only.
See application file for complete search history.

(56) References Cited

U.S. PATENT DOCUMENTS

| 10,257,072 | B1 | 4/2019 | Salam | |
| 10,715,427 | B2 * | 7/2020 | Raj | H04L 45/48 |
| 2010/0034211 | A1 * | 2/2010 | Yanagihara | H04L 12/1877 370/408 |
| 2016/0028608 | A1 | 1/2016 | Dasgupta et al. | |
| 2016/0112327 | A1 | 4/2016 | Morris et al. | |
| 2017/0155590 | A1 * | 6/2017 | Dillon | H04L 41/5025 |
| 2018/0302320 | A1 | 10/2018 | Aranha et al. | |

(Continued)

OTHER PUBLICATIONS

"Aruba Configuring Policies for Dynamic Path Steering" pp. 1-3, Retrieved from the Internet on Apr. 12, 2019 from URL: <help.central.arubanetworks.com/latest/documentation/online_help/content/sd_wan/gateway_management/wan/dps.htm >.

(Continued)

*Primary Examiner* — Xavier S Wong
(74) *Attorney, Agent, or Firm* — Hewlett Packard Enterprise Patent Department

(57) ABSTRACT

An example non-transitory, computer-readable medium includes instructions that cause a device to determine, for uplinks of a branch gateway, a link health baseline. The instructions further cause the device to determine, for a set of criticality classes, a class link health baseline for each link health baseline, based on the link health baseline and a tolerance level of each criticality class. The instructions further cause the device to calculate, based in part on weighted parameters of the class link health baselines and an uplink cost, a path quality threshold score for each application category and for each uplink. The instructions further cause the device to select, for each application category, a primary uplink and a secondary uplink based on the path quality threshold scores. The instructions further cause the device to route network traffic through the primary uplink of the application category assigned to the network traffic.

20 Claims, 5 Drawing Sheets

(56) References Cited

U.S. PATENT DOCUMENTS

2019/0207844 A1* 7/2019 Kodavanty ......... H04L 12/4633
2019/0281611 A1* 9/2019 Bao ..................... H04L 61/2575

OTHER PUBLICATIONS

Migues, S., "Synopsys Risk Ranking Your Applications: a Method to the Madness" Jun. 18, 2015, pp. 1-7, Retrieved from the Internet on Apr. 12, 2019 from URL: <synopsys.com/blogs/software-security/risk-ranking-applications/ >.

* cited by examiner

UPLINK SELECTION IN A SD-WAN

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to form the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and head-end gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and headend gateways) controls certain aspects of routing for their respective LAN, but a network orchestrator controls the overall switching and routing across the WAN.

In a SD-WAN topology, a branch may connect to a core site via multiple uplinks between a BG and a headend gateway. These multiple uplinks may be used for high availability (HA) and load sharing and balancing. The multiple uplinks may use different internet service providers (ISPs), different communication technologies, or a combination thereof.

One method for connecting between sites using multiple uplinks is Active-Standby HA. This method uses one (or more) of the uplinks to actively transceive data between the sites and holds one (or more) of the uplinks in idle reserve in case of failure of one of the active uplinks. One of the negative consequences of Active-Standby HA is that there are uplinks paid for and installed that are not used unless there is a failure condition in the network. This is wasteful.

Another method for connecting between sites using multiple uplinks is Active-Active HA. This method uses all available uplinks to transceive data between the SD-WAN sites, and when an uplink fails, the traffic that would otherwise have traversed that uplink is instead transmitted across another active uplink.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
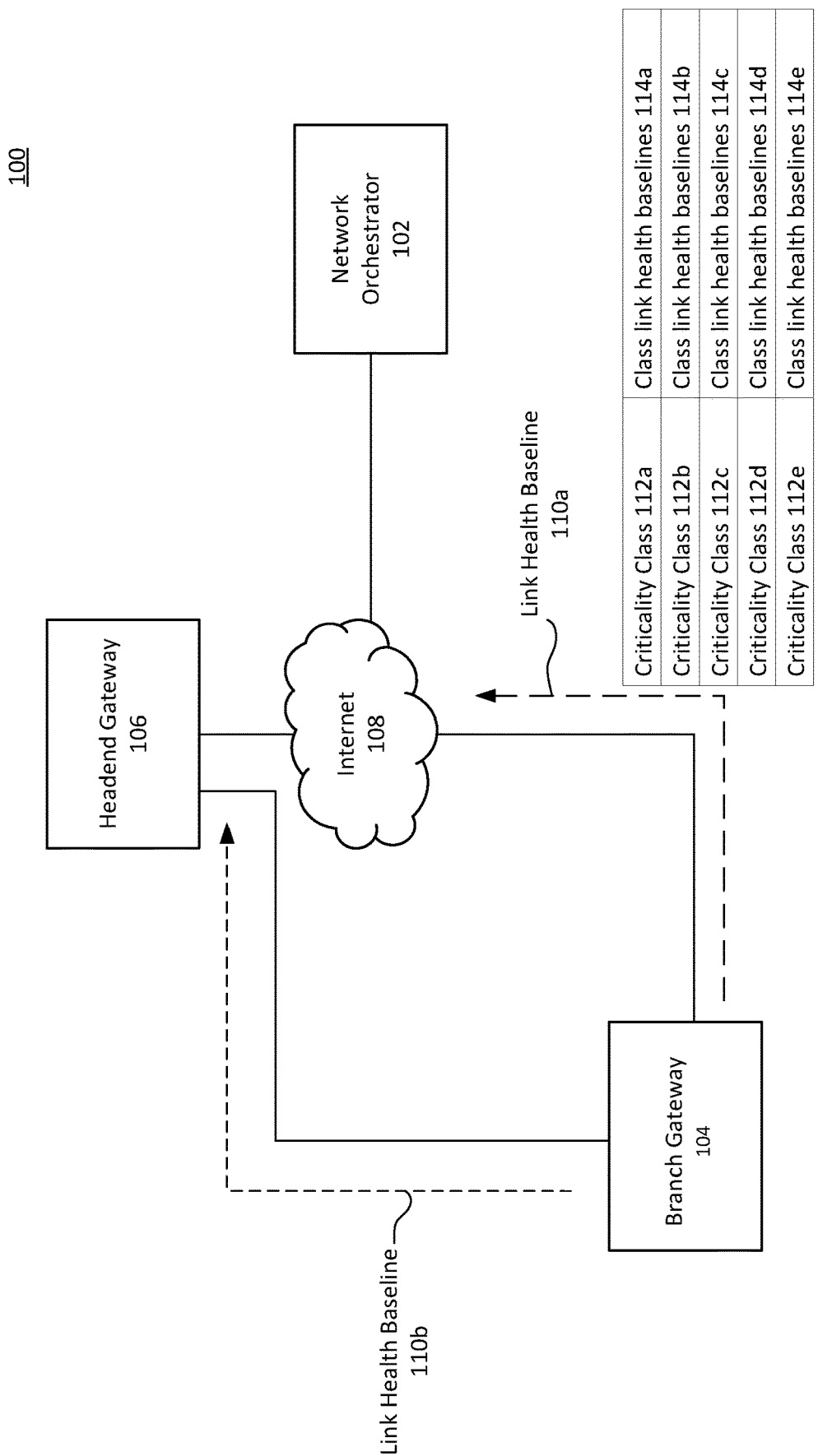
FIG. 1 illustrates an example SD-WAN in which a branch gateway has multiple uplinks to a headend gateway.

certain examples have features that are in addition to or in lieu of the features illustrated in the above-referenced figures. Certain labels may be omitted from certain figures for the sake of clarity.

DETAILED DESCRIPTION

When a SD-WAN employs Active-Active HA to use multiple uplinks connecting sites in the SD-WAN, traffic load between the sites should be balanced between the uplinks to ensure efficient use of the available bandwidth. In some SD-WANs, flows may establish routes for each device of each site that go through one of the uplinks. For example, each successive device to join the SD-WAN at a branch site may be assigned to a successive uplink in a round-robin format.

However, naively sorting devices does not account for the different usage patterns of different devices, the different priority of the various connections each device makes, or the dynamic behaviors of the uplinks.

For example, a server device may have a different network traffic profile than an employee laptop, which may have a different network traffic profile than an Internet of Things (IoT) device. Naively sorting devices round-robin may result in heavy traffic generating devices being clustered on a single uplink, overwhelming that uplink while leaving unused bandwidth on other uplinks.

Moreover, each device may transceive packets through multiple logical connections, each of which may have a different purpose. For example, an employee laptop may have connections established with an Office365 cloud service for enterprise email and document services, a database in a core site for access to employee records, a VoIP conference server for a video conference call, and Facebook for non-work entertainment purposes. Each connection has its own priority and requirements. For example, the VoIP connection may be a high priority because it is business critical, and the streaming video is highly sensitive to reductions in SD-WAN route health. The Office365 connection may be less priority because although it is business critical, the Office365 applications are less sensitive to reductions in route health as compared to the VoIP connection. The Facebook connection may be a low priority because it is not business critical, and it is not very sensitive to reductions in route health.

Also, each uplink may not behave entirely consistently over time. For example, during certain times of day, a physical link in the Internet over which the uplink travels may degrade, and performance of the uplink may likewise degrade.

By determining characteristics of various applications transceiving traffic across the SD-WAN using deep packet inspection (DPI), a criticality score can be determined for each application. Then, applications can be classified into criticality classes based on their respective criticality scores. The criticality scores may take various parameters into account, including number of users accessing the application (user count), number of bytes being transacted across the network, number of packets being transacted across the network, a category of the application, and a reputation of the application.

Also, link health information is gathered for each uplink between the sites, including information for various parameters, including bandwidth utilization, jitter, latency, and packet loss. A link health baseline may be generated for each uplink based on the respective collected link health information. For each criticality class, a class link health baseline may be calculated for each uplink based on a tolerance level associated with the criticality class. For example, a network administrator may assign a tolerance level of 0.9 to a certain criticality class. The class link health baseline for the certain criticality class on a certain uplink may include parameters that are 0.9× the respective parameters in the link health baseline of the certain uplink.

Based on the class link health baselines, a path quality threshold score is determined for each uplink and for each application category (as determined by DPI). Then, each uplink may be ranked based on the path quality threshold score, and the top raking uplink may be selected as a primary uplink for the application category. The next top ranking uplink may be selected as a secondary uplink, and additional uplinks may be used as standby uplinks. In some examples, the path quality threshold score for an uplink is calculated using the threshold level for the criticality class of the application category as a weight for parameters of the link health baseline, and a weighted cost of the uplink. A network administrator may adjust the weights of each parameter to achieve an efficient ranking of uplinks by application category.

Periodically, uplink assignments may be reviewed and reconfigured if uplink health has significantly changed or if additional applications have begun being used on the network.

In many SD-WAN topologies, a network orchestrator controls the operation of the SD-WAN. The network orchestrator may gather data from various network infrastructure devices throughout the network, including the aforementioned information. The network orchestrator may then perform the actions to determine which uplink to assign to which application category and transmit flows to the SD-WAN to properly route the traffic.

FIG. 1 illustrates an example SD-WAN in which a branch gateway has multiple uplinks to a headend gateway. SD-WAN 100 includes network orchestrator 102, branch gateway 104, headend gateway 106, and Internet 108. One uplink between branch gateway 104 and headend gateway 106 passes through public connections of Internet 108, as may occur with a DSL connection. The other uplink between branch gateway 104 and headend gateway 106 does not pass through public connections of Internet 108, as may occur with a MPLS connection.

Network orchestrator 102 may receive information from branch gateway 104 and headend gateway 106, as well as other network infrastructure devices throughout SD-WAN 100 that includes information from network traffic that has not been previously classified. For example, a client device on the branch associated with branch gateway 104 may initiate a connection with a project management application server. The project management application may not have previously been accessed by a device on SD-WAN 100, and branch gateway 104 may not have a flow rule to handle routing of the project management application packets. Branch gateway 104 may send portions (or the entirety) of the packets received from the client device and/or the project management application server to network orchestrator 102 for analysis.

Network orchestrator 102 may send the received information to a DPI service of SD-WAN 100 to determine information about the new application. The DPI service may return information about the application including an application name, application category, and application reputation. The DPI service may be provided based on information gathered both from SD-WAN 100 and from other networks. Network orchestrator 102 may compile additional information about the application, including number of users of the application in SD-WAN 100, traffic density in number of bytes and number of packets, etc. This process may occur for each application transmitting data across the SD-WAN.

Once information is gathered about the new application, the application is assigned to a criticality class 112b. Network orchestrator 102 may use a machine learning classifier to assign the application to the criticality class 112b. There may any number of criticality classes 112. For example, FIG. 1 illustrates an example with five criticality classes 112a-e. In some examples, each criticality class 112 may describe certain business and quality of service (QoS) priorities shared by applications of that criticality class. For example, criticality class 112a may be for non-business critical applications with high priority QoS requirements, such as live sports video streaming. Criticality class 112b may be for business critical applications with high priority QoS requirements, such as video conferencing. Each criticality class 112 may be treated differently by SD-WAN 100 than other criticality classes 112. For example, criticality class 112a may be given a less suitable uplink than criticality class 112b. Each application transmitting data across the SD-WAN may be classified in one of the criticality classes 112.

Network orchestrator 102 may also instruct branch gateway 104 and headend gateway 106 to probe each uplink between the sites to determine link health. These probes may be send periodically, on demand from network orchestrator 102, or on any other appropriate interrupt. Information gathered from these probes may include jitter, latency, placket loss, and bandwidth utilization. Network orchestrator 102 may filter certain points of the time-series data received from the probes. For example, network orchestrator 201 may remove all data points in the link health information that correspond to a time when an uplink has greater than 80% bandwidth utilization in order to remove data points where link health parameters may behave abnormally.

From the gathered link health information, network orchestrator 102 determines link health baselines for each uplink of the branch gateway. Network orchestrator 102 may use a baselining algorithm to determine the link health baselines. As an example, a link health baseline for an uplink may be as follows:

Baseline jitter: 106.87 milliseconds
Baseline latency: 142.5 milliseconds
Baseline packet loss: 1.068%
Baseline bandwidth utilization: 41%

Network orchestrator 102 determines a link health baseline 110a for the uplink traversing Internet 108. Network orchestrator 102 also determines a link health baseline 110b for the uplink not traversing Internet 108. Network orchestrator 102 then determines class link health baselines 114 for each criticality class and for each uplink. Network orchestrator 102 may use a tolerance level provided by a network administrator for the criticality class 112 to determine each class link health baselines 114 for the criticality class 112.

For example, if a network administrator provides a tolerance level of 0.9 for criticality class 112a, class link health baselines 114a may include a baseline that is 0.9× of link health baseline 110a and a baseline that is 0.9× of link health baseline 110b. The network administrator may provide tolerance levels for each criticality class 112.

Once class link health baselines 114 are determined for each criticality class 112 and each uplink, network orchestrator 102 can calculate path quality threshold scores for each application category on each uplink based on the applicable class link health baselines 114, uplink cost, and parameter weights supplied by a network administrator. Network orchestrator 102 can rank uplinks based on path quality threshold scores for the respective application category and assign the highest ranked uplink as primary uplink for the application category, as further described in FIGS. 2 and 3.

Figure 2:
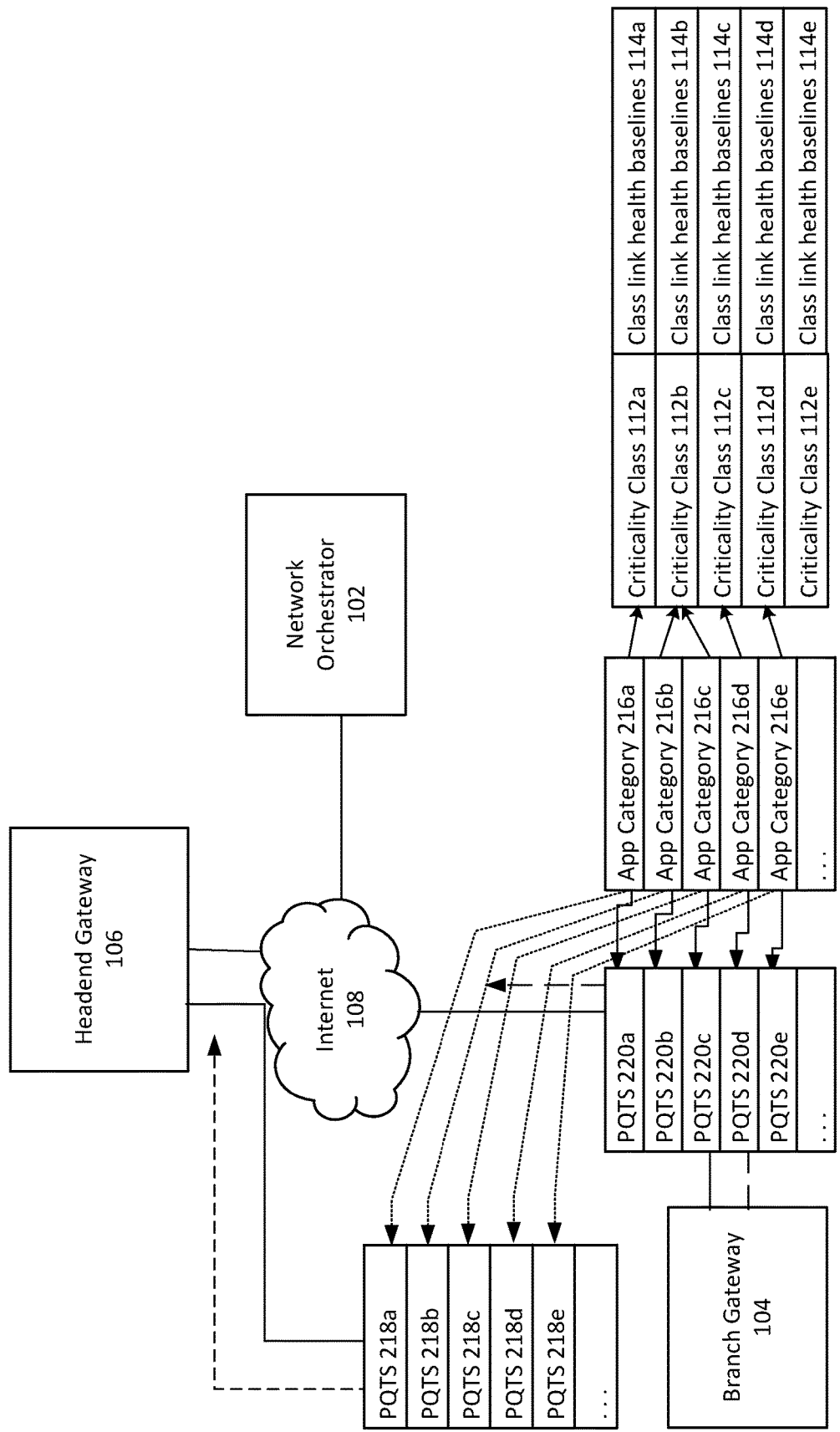
FIG. 2 illustrates an example SD-WAN including path quality threshold scores for each uplink.

FIG. 2 illustrates an example SD-WAN including path quality threshold scores for each uplink. Network orchestrator 102 uses a path quality threshold algorithm to determine path quality threshold scores 218 and 220 for each uplink and for each application category 216. FIG. 2 illustrates only a small number of application categories 216 for the sake of clarity. Application categories 216, in most examples, have a many-to-one relationship with criticality classes 112. For each application category 216a, network orchestrator 102 uses class link health baselines 114a of the application category's criticality class 112a, along with an uplink cost to determine path quality threshold scores 218a and 220a for each uplink from branch gateway 104. Each parameter used in the path quality threshold algorithm is normalized (e.g. to a Z-score, to a percentage, etc.) and each parameter is weighted using weights provided by a network administrator. For example, a network administrator may heavily weight latency, jitter, and packet loss for video conferencing applications because they are business critical and they are highly sensitive to those link health parameters. However, the network administrator may heavily weight uplink cost for social media applications because they are not business critical and they are not highly sensitive to link health.

For example, a path quality threshold score may be calculated using the following path quality threshold algorithm.

$$PQTS = weight1*Nupcost + weight2*Nbwutil + weight3*Npakloss + weight4*Njitter + weight5*Nlatency$$

Where PQTS is the path quality threshold score, Nupcost is the normalized uplink cost, Nbwutil is the normalized bandwidth utilization, Npakloss is the normalized packet loss, Njitter is the normalized jitter, Nlatency is the normalized latency, and weights 1-5 are network administrator provided weights for the respective parameters. For example, a network administrator may adjust weights of a path quality threshold algorithm for a non-business critical video streaming application to emphasize uplink cost (by increasing weight1) and to de-emphasize link health parameters (by reducing weights 2-5). As another example, a network administrator my adjust weights of a path quality threshold algorithm for a business critical video streaming application to emphasize packet loss (by increasing weight3), jitter (by increasing weight4) and latency (by increasing weights) because video streaming applications are sensitive to those link health parameters.

Once path quality threshold scores 218 and 220 are calculated for each uplink and for each application category 216, uplinks are ranked for each application category 216. For example, application category 216a may have a PQTS 220a of 1.104 for a first uplink and a PQTS 218a of 1.311 for a second uplink. Since PQTS 220a is less than PQTS 218a, the first uplink is ranked ahead of the second uplink. Although the PQTSs are described as a lower score being a higher path quality, this disclosure contemplates any appropriate formulation of a PQTS.

Figure 3:
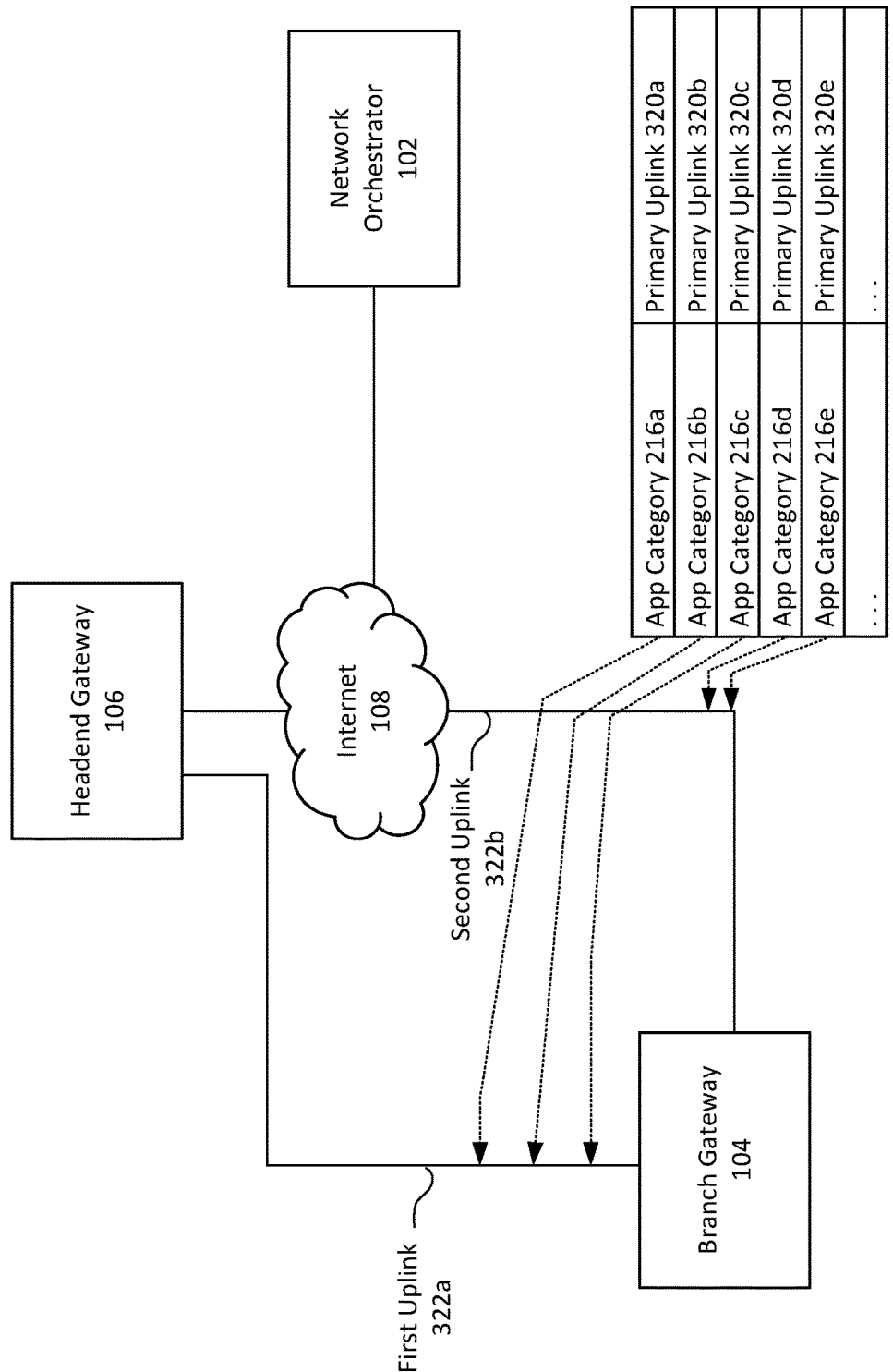
FIG. 3 illustrates an example SD-WAN including primary uplinks selected for application categories.

After the PQTSs 218 and 220 are ranked for each application category, network orchestrator 102 selects a primary uplink for each application category, as further described in FIG. 3.

FIG. 3 illustrates an example SD-WAN including primary uplinks selected for application categories. Once each PQTS is determined, as described in FIG. 2, the PQTSs are ranked for each application category 216. For example, if a PQTS for a first uplink 322a is less than a PQTS for a second uplink 322b for application category 216a, then network orchestrator 102 ranks the first uplink 322a higher than the second uplink 322b.

Once the uplinks are ranked for each application category 216, network orchestrator 102 selects a primary uplink 320 that is the highest ranked uplink 322 for the application category 216. For example, since first uplink 322a is ranked higher than second uplink 322b for application category 216a, primary uplink 320a may be set to first uplink 322a. In some examples, network orchestrator 102 generates a SD-WAN flow for application category 216a, routing traffic associated with application category 216a through first uplink 322a (primary uplink 320a). The network orchestrator 102 then transmits the SD-WAN flow to the SD-WAN for implementation by network infrastructure devices including branch gateway 104 and headend gateway 106. Likewise, for each additional application category 216b-e, each uplink 322 is ranked based on PQTS, and the highest ranked uplink 322 is assigned as primary uplink 320b-e for the application category 216b-e. Network orchestrator 102 may similarly generate and transmit SD-WAN flows for each application category 216b-e.

Secondary uplinks and standby uplinks may also be selected for each application category 216. Secondary uplinks may carry portions of data traffic for the application category 216. Standby uplinks may be activated if the primary or secondary uplinks fail, in a failover scenario.

Figure 4:
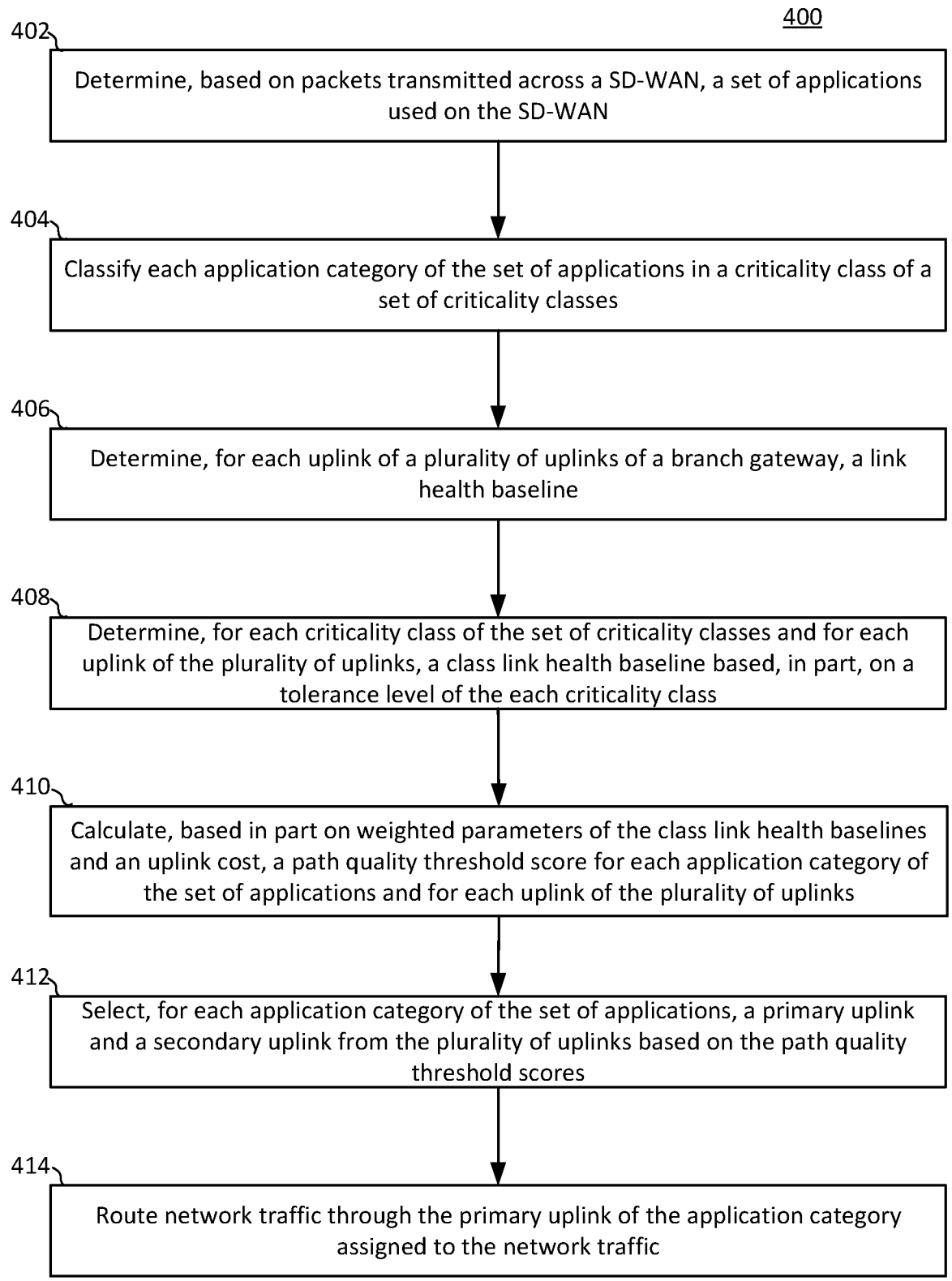
FIG. 4 is a flowchart illustrating an example method for selecting an uplink in a SD-WAN.

FIG. 4 is a flowchart illustrating an example method 400 for selecting an uplink in a SD-WAN. Method 400 may be executed by a network orchestrator of a SD-WAN. Alternatively, method 400 may be executed by a branch gateway of a SD-WAN.

In block 402, a set of applications used on the SD-WAN is determined based on packets transmitted across the SD-WAN. In some examples, the set of applications is determined by providing packets transmitted across the SD-WAN to a deep packet inspection (DPI) service. The DPI service may provide, in response to the provided packets, at least one of: an application name, an application category, and an application reputation from information collected from the SD-WAN and other networks.

In block 404, each application category of the set of applications is classified in a criticality class of a set of criticality classes. An example set of criticality classes may include a high business criticality class, a low business criticality class, and a non-business criticality class.

In block 406, a link health baseline is determined for each uplink of a plurality of uplinks of a branch gateway. In some examples, each link health baseline is determined based on measured link health information. Some datapoints, such as measurements taken when bandwidth utilization of the corresponding uplink is greater than a threshold, may not be included in the link health information used to determine the respective link health baseline. For example, measurements taken when bandwidth utilization is above 80% may be filtered from the link health information because link health parameters of the uplink may behave unpredictably at such high bandwidth utilization levels.

In block 408, a class link health baseline is determined for each combination of criticality class of the set of criticality classes and uplink of the plurality of uplinks. Each class link health baseline is based, in part, on a tolerance level of the respective criticality class. In some examples, the tolerance level for each criticality class is provided by a network administrator. In some examples, the tolerance level of a certain criticality class is multiplied by parameters of a certain uplink's link health baseline to determine the class link health baseline for the certain criticality class on the certain uplink.

In block 410, a path quality threshold score for each application category of the set of applications and for each uplink of the plurality of uplinks is calculated based in part on weighted parameters of the associated class link health baseline and an uplink cost of the each uplink. in some examples, each parameter is weighted by a network administrator based on the application category.

In block 412, a primary uplink and a secondary uplink are selected from the plurality of uplinks for each application category of the set of applications. Each primary and secondary uplinks are selected based on the relevant path quality threshold score. For example, each uplink of the plurality of uplinks may be ranked based on their respective PQTS for a certain application category. Then, the highest ranking uplink is selected as the primary uplink and the next highest ranking uplink is selected as the secondary uplink. Additional uplinks may be selected as standby uplinks in case of failure.

In block 414, network traffic is routed through the primary uplink of the application category assigned to the network traffic. In some examples, a SD-WAN flow is generated for the application category that instructs network infrastructure devices of the SD-WAN to route network traffic of the application category through the primary uplink. The SD-WAN flow may be transmitted throughout the SD-WAN to facilitate such routing.

Figure 5:
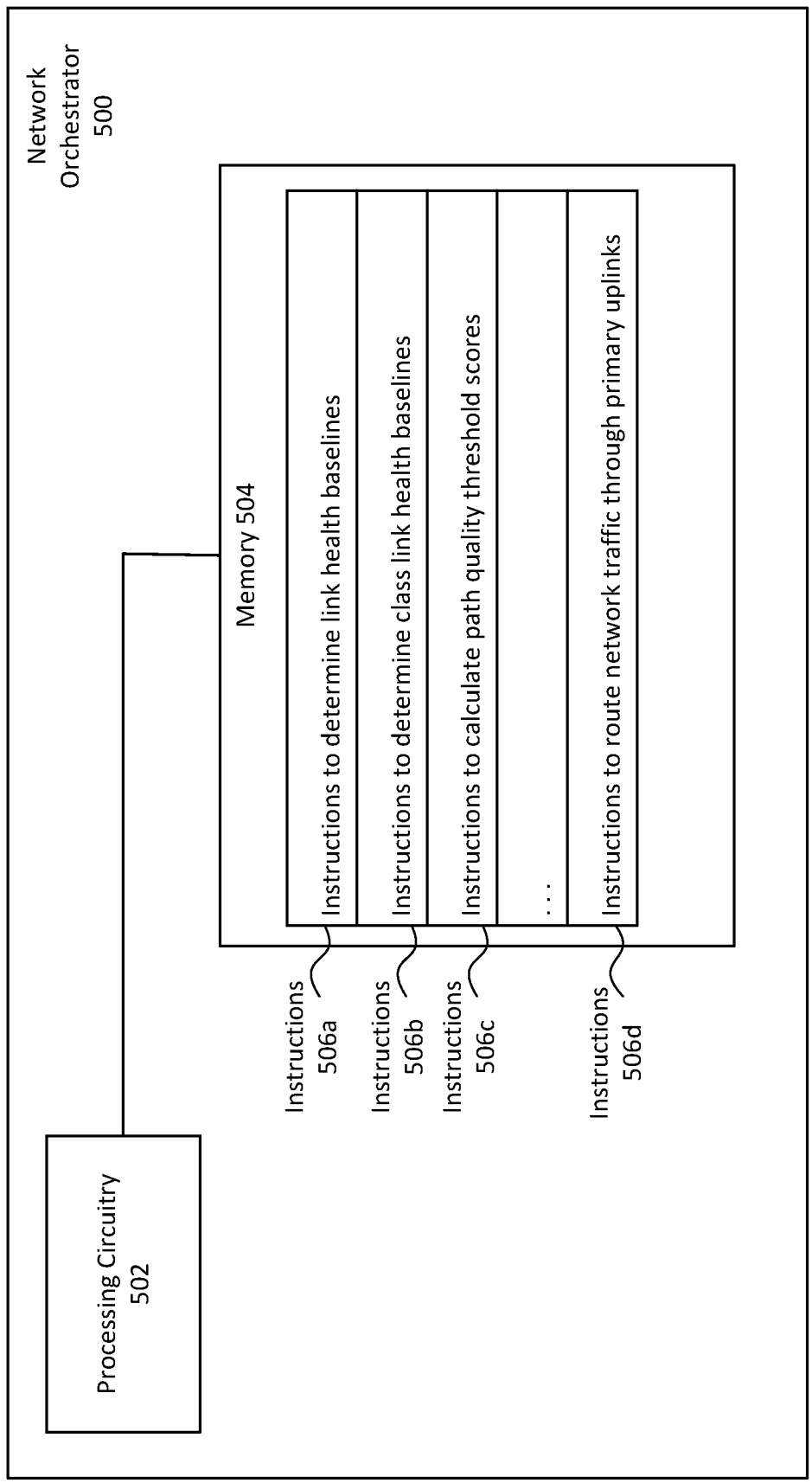
FIG. 5 illustrates an example network orchestrator that selects uplinks in a SD-WAN.

FIG. 5 illustrates an example network orchestrator that selects uplinks in a SD-WAN. Network orchestrator 500 includes processing circuitry 502 communicatively coupled to memory 504. Memory 504 is a non-transitory, computer-readable medium including instructions 506 that, when executed by processing circuitry 502, cause network orchestrator 500 to undertake certain actions. Although network orchestrator 500 is illustrated as a computing device, it may instead be a service or application executing on one or more computing devices.

Instructions 506a cause network orchestrator 500 to determine, for each uplink of a plurality of uplinks of a branch gateway, a link health baseline.

Instructions 506b cause network orchestrator 500 to determine, for each combination of criticality class of a set of criticality classes and link health baseline, a class link health baseline based on the each link health baseline and a tolerance level of each criticality class. In some examples, the tolerance levels are provided to network orchestrator 500 by a network administrator for each criticality class of the set of criticality classes.

Instructions 506c cause network orchestrator 500 to calculate, based in part on weighted parameters of the class link health baselines and an uplink cost, a path quality threshold score for each application category of a set of applications and for each uplink of the plurality of uplinks.

Instructions 506d cause network orchestrator 500 to route network traffic through a primary uplink of the application category assigned to the network traffic.

Additional instructions may cause network orchestrator 500 to select, for each application category of the set of applications, a primary uplink and a secondary uplink from the plurality of uplinks based on the path quality threshold scores.

Additional instructions may cause network orchestrator 500 to determine, based on packets transmitted across a software defined wide area network (SD-WAN) the set of applications and classify each application category of the set of applications in a criticality class of a set of criticality classes. In some examples, the determining a set of applications used includes providing packets transmitted across the SD-WAN to a deep packet inspection (DPI) service.

Additional instructions may cause network orchestrator 500 to generate a SD-WAN flow for each application category of the set of applications and transmit the each SD-WAN flow to the SD-WAN. In some examples, each SD-WAN flow instructs the SD-WAN to route traffic for each application category through the respective primary uplink of the each application category.

Flows are groups of network traffic in a SDN network that are routed based on flow-specific rules. For example, a flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g. firewall), role-based limitations (e.g. only the marketing department has access to social media while on the enterprise network), or other routing preferences.

Routes are paths through a network. Often, "flows" and "routes" are used as near-synonyms. "Flows" can often describe both the classification of packets to a flow pattern, as well as the path those classified packets take through the SDN overlay network. "Routes" more often refer to the path those packets take through the physical underlay network.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

We claim:

1. A network orchestrator, comprising:
   processing circuitry; and
   a memory including instructions that, when executed by the processing circuitry, cause the network orchestrator to:
   classify each application category of a set of applications transmitting data across a software defined wide area network (SD-WAN) as one of a set of criticality classes;
   determine link health baselines for each uplink of a plurality of uplinks of a branch gateway;
   for each criticality class of the set of criticality classes, determine a class link health baseline for each uplink of the plurality of uplinks based, in part, on a tolerance level;
   calculate, based in part on the class link health baselines and an uplink cost, a path quality threshold score for each application category of the set of applications and for each uplink of the plurality of uplinks;
   for each application category of the set of applications, select a primary uplink and a secondary uplink from the plurality of uplinks based on the path quality threshold scores;
   route network traffic through the primary uplink of the application category assigned to the network traffic.

2. The network orchestrator of claim 1, wherein the link health baselines are determined based on measured link health information, and wherein measurements when uplink bandwidth utilization is greater than a threshold are not included in the link health information.

3. The network orchestrator of claim 1, wherein tolerance levels are provided to the network orchestrator by a network administrator for each criticality class of the set of criticality classes.

4. The network orchestrator of claim 3, wherein a tolerance level of a criticality class is multiplied by parameters of a link health baseline of an uplink to calculate a class link health baseline for the criticality class on the uplink.

5. The network orchestrator of claim 1, further including instructions to cause the network orchestrator to generate a SD-WAN flow for each application category of the set of applications and transmit the each SD-WAN flow to the SD-WAN.

6. The network orchestrator of claim 5, wherein each SD-WAN flow instructs the SD-WAN to route traffic for each application category through the respective primary uplink of the each application category.

7. A method, comprising:
determining, based on packets transmitted across a software defined wide area network (SD-WAN), a set of applications used on the SD-WAN;
classifying each application category of the set of applications in a criticality class of a set of criticality classes;
determining, for each uplink of a plurality of uplinks of a branch gateway, a link health baseline;
determining, for each criticality class of the set of criticality classes and for each uplink of the plurality of uplinks, a class link health baseline based, in part, on a tolerance level of the each criticality class;
calculating, based in part on weighted parameters of the class link health baselines and an uplink cost, a path quality threshold score for each application category of the set of applications and for each uplink of the plurality of uplinks;
selecting, for each application category of the set of applications, a primary uplink and a secondary uplink from the plurality of uplinks based on the path quality threshold scores;
routing network traffic through the primary uplink of the application category assigned to the network traffic.

8. The method of claim 7, wherein the determining a set of applications used includes providing packets transmitted across the SD-WAN to a deep packet inspection (DPI) service.

9. The method of claim 8, wherein the DPI service provides an application name and an application category in response to the packets transmitted across the SD-WAN.

10. The method of claim 7, wherein the link health baselines are determined based on measured link health information, and wherein measurements when uplink bandwidth utilization is greater than a threshold are not included in the link health information.

11. The method of claim 7, wherein a tolerance level of a criticality class is multiplied by parameters of a link health baseline of an uplink to determine a class link health baseline for the criticality class on the uplink.

12. The method of claim 7, further including generating a SD-WAN flow for each application category of the set of applications and transmitting the each SD-WAN flow to the SD-WAN.

13. The method of claim 12, wherein each SD-WAN flow instructs the SD-WAN to route traffic for each application category through the respective primary uplink of the each application category.

14. A non-transitory, computer-readable medium comprising instructions that, when executed by processing circuitry, cause a device to:
determine, for each uplink of a plurality of uplinks of a branch gateway, a link health baseline;
determine, for each criticality class of a set of criticality classes, a class link health baseline for each link health baseline, based on the each link health baseline and a tolerance level of the each criticality class;
calculate, based in part on weighted parameters of the class link health baselines and an uplink cost, a path quality threshold score for each application category of a set of applications and for each uplink of the plurality of uplinks;
select, for each application category of the set of applications, a primary uplink and a secondary uplink from the plurality of uplinks based on the path quality threshold scores;
route network traffic through the primary uplink of the application category assigned to the network traffic.

15. The computer-readable medium of claim 14, further causing the device to:
determine, based on packets transmitted across a software defined wide area network (SD-WAN) the set of applications; and
classify each application category of the set of applications in a criticality class of a set of criticality classes.

16. The computer-readable medium of claim 15, wherein the determining a set of applications used includes providing packets transmitted across the SD-WAN to a deep packet inspection (DPI) service.

17. The computer-readable medium of claim 14, wherein tolerance levels are provided to the network orchestrator by a network administrator for each criticality class of the set of criticality classes.

18. The computer-readable medium of claim 17, wherein a tolerance level of a criticality class is multiplied by parameters of a link health baseline of an uplink to calculate a class link health baseline for the criticality class on the uplink.

19. The computer-readable medium of claim 14, further causing the device to:
generate a SD-WAN flow for each application category of the set of applications; and
transmit the each SD-WAN flow to the SD-WAN.

20. The computer-readable medium of claim 19, wherein each SD-WAN flow instructs the SD-WAN to route traffic for each application category through the respective primary uplink of the each application category.

* * * * *